(12) United States Patent
Watanabe

(10) Patent No.: US 9,898,230 B2
(45) Date of Patent: Feb. 20, 2018

(54) INFORMATION PROCESSING APPARATUS, SYSTEM, AND INFORMATION PROCESSING METHOD

(71) Applicant: CANON KABUSHIKI KAISHA, Tokyo (JP)

(72) Inventor: Kazunari Watanabe, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 20 days.

(21) Appl. No.: 14/688,273

(22) Filed: Apr. 16, 2015

(65) Prior Publication Data

US 2015/0301886 A1 Oct. 22, 2015

(30) Foreign Application Priority Data

Apr. 22, 2014 (JP) .................................. 2014-088553

(51) Int. Cl.
*G06F 11/10* (2006.01)
*G06F 3/06* (2006.01)
*G06F 13/28* (2006.01)

(52) U.S. Cl.
CPC ............ *G06F 3/0683* (2013.01); *G06F 3/064* (2013.01); *G06F 3/0619* (2013.01); *G06F 11/10* (2013.01); *G06F 13/28* (2013.01)

(58) Field of Classification Search
CPC ...... G06F 3/0619; G06F 11/10; G06F 3/0683; G06F 3/064
See application file for complete search history.

(56) References Cited

U.S. PATENT DOCUMENTS

| 6,003,089 A | * | 12/1999 | Shaffer | ............... | H04L 47/36 |
| | | | | | 370/232 |
| 7,058,980 B1 | * | 6/2006 | Link | ................. | G06F 21/79 |
| | | | | | 711/166 |
| 2005/0068897 A1 | * | 3/2005 | Arita | ................. | H04L 49/90 |
| | | | | | 370/235 |

(Continued)

FOREIGN PATENT DOCUMENTS

| JP | 2004-153471 A | 5/2004 |
| JP | 2005-102037 A | 4/2005 |

(Continued)

OTHER PUBLICATIONS

Japanese Office Action for Japanese Application No. 2014-088553 dated Dec. 15, 2017, 5 pages.

*Primary Examiner* — Kyle Vallecillo
(74) *Attorney, Agent, or Firm* — Carter, DeLuca, Farrell & Schmidt, LLP

(57) ABSTRACT

The apparatus comprises a register, a transferring unit that transfers data stored in a first memory to a second memory, and a calculator that applies a checksum operation to the data being transferred by the transferring unit. When a first mode is set, the calculator transmits the result of the checksum operation to the transferring unit, and the transferring unit transfers the result to the second memory. When a second mode is set, the calculator applies the checksum operation to partial data that is included in the data and has been specified as a target of the checksum operation, and transmits the result of the checksum operation applied to the partial data to the register.

6 Claims, 5 Drawing Sheets

(56) References Cited

U.S. PATENT DOCUMENTS

2005/0083917 A1* 4/2005 Okamoto ............... H04L 29/06
370/352
2011/0238621 A1* 9/2011 Agrawal ........... G06F 17/30578
707/610

FOREIGN PATENT DOCUMENTS

| JP | 2008-129632 A | 6/2008 |
| JP | 2010-041498 A | 2/2010 |

* cited by examiner

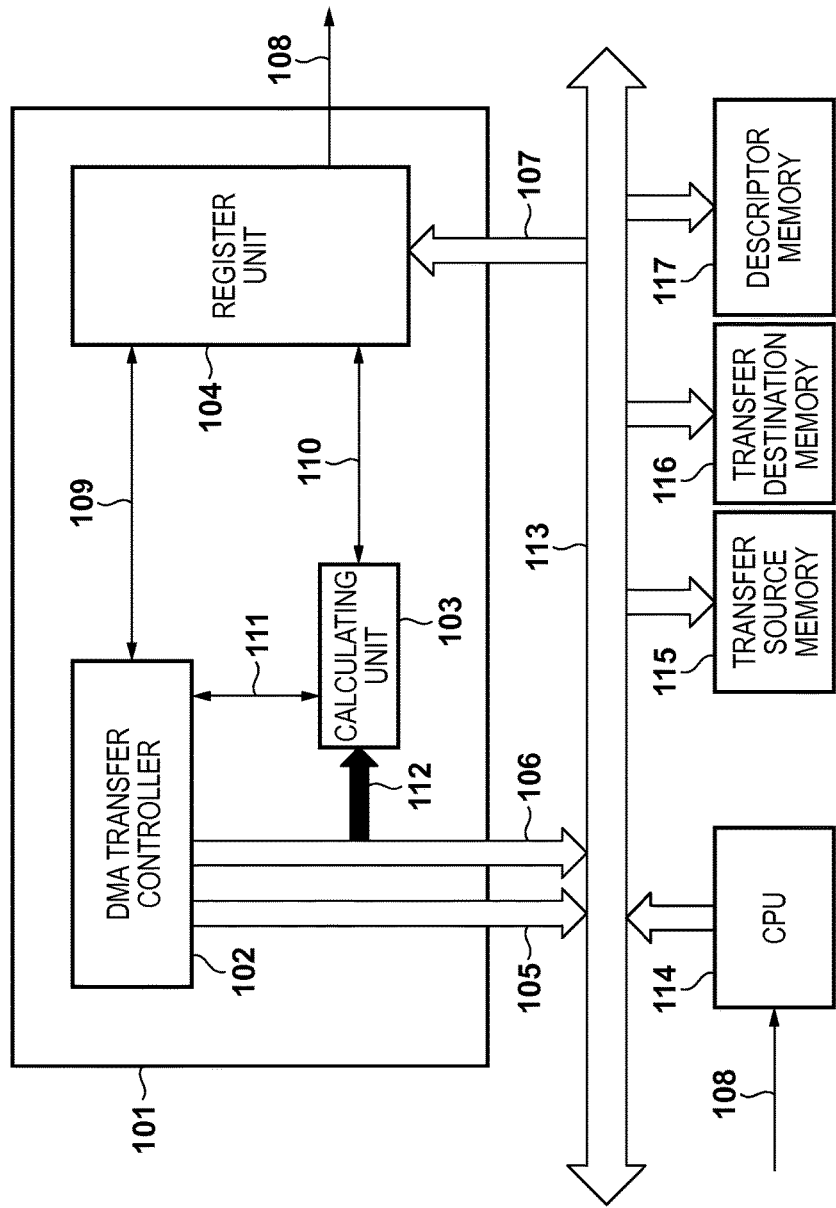

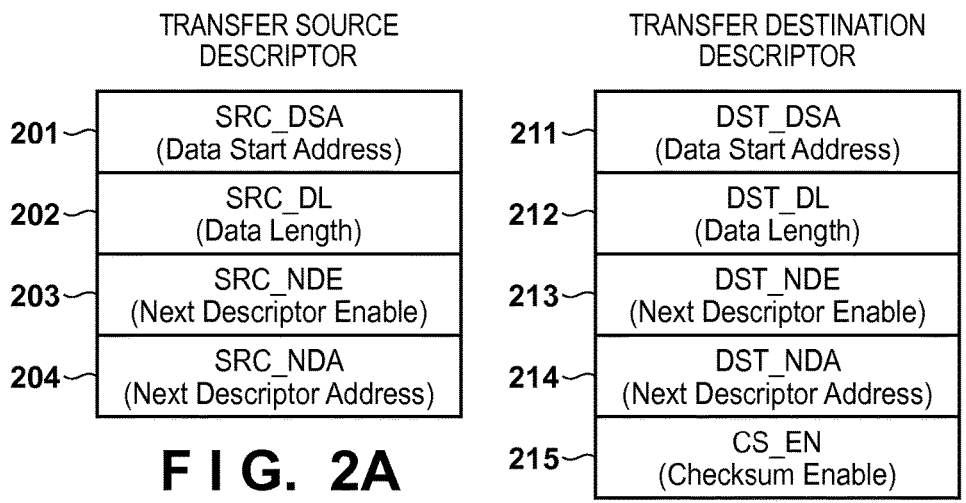
FIG. 2A
FIG. 2B
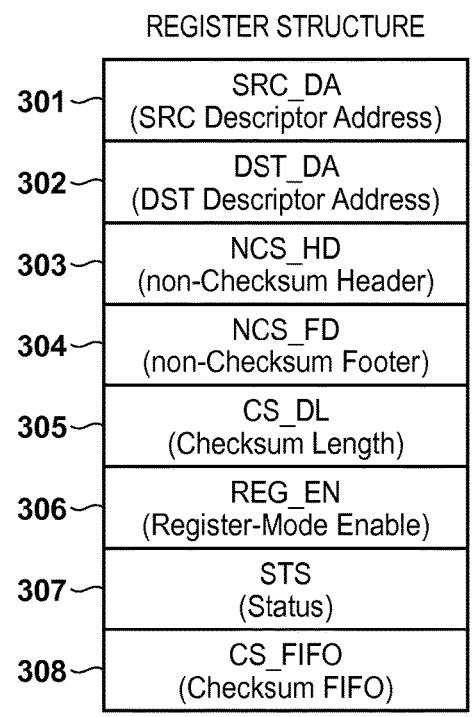
FIG. 3

INFORMATION PROCESSING APPARATUS, SYSTEM, AND INFORMATION PROCESSING METHOD

BACKGROUND OF THE INVENTION

Field of the Invention

The present invention relates to a data processing technique, and in particular to a technique to apply a checksum operation to transfer data concurrently with DMA transfer.

Description of the Related Art

There are communication devices that transfer data to a communication partner by connecting to a network using TCP (Transmission Control Protocol)/IP (Internet Protocol) communication protocols. In recent years, there are an increasing number of situations where such communication devices transfer high-resolution, high-definition image data to each other. In order to enable broadband data transfer, it is vital that the communication devices execute communication protocol processing at high speed.

According to the TCP/IP communication protocols, a packet is formed by appending a header, such as an address of a transmission destination and an error correction code, to data to be transferred, and communication is performed in units of packets. A checksum is used for the error correction code, and is calculated by obtaining the one's complement of the one's complement sum of an entire packet.

As such, the TCP/IP communication protocols require application of calculation processing to an entire packet to obtain a checksum. Therefore, high-speed execution of this calculation processing is necessary to increase the speed of communication protocol processing.

In order to execute the above-described checksum operation at high speed, various apparatuses and control methods have been proposed so far, one of them being an operation circuit described in Japanese Patent Laid-Open No. 2008-129632. This operation circuit performs an operation of an arbitrary number of input data pieces by using DMA transfer according to a description of a descriptor, and outputs the operation result; in order to perform operation processing, it divides the arbitrary number of input data pieces into a plurality of pieces, instead of performing an operation of the arbitrary number of input data pieces at a time. The operation circuit stores an intermediate result for each of the divided operations in an external storage device, performs operation processing by reading the intermediate result in the next operation processing, and obtains a final result by repeating the same.

The operation circuit described in Japanese Patent Laid-Open No. 2008-129632 performs DMA transfer to execute operation processing, and applies operation processing to the entire data targeted for DMA transfer. However, the problem with the above-described conventional example is that it does not support operation processing applied to a portion of data targeted for DMA transfer (for example, the portion other than the header and the footer).

SUMMARY OF THE INVENTION

The present invention has been made in view of the above problem, and provides a technique to provide a calculation processing method suited for a case in which calculation processing is applied to the entirety of data targeted for DMA transfer, and a calculation processing method suited for a case in which calculation processing is applied to a portion of transfer data.

According to the first aspect of the present invention, there is provided an information processing apparatus, comprising: a register; a transferring unit that transfers data stored in a first memory to a second memory; and a calculator that applies a checksum operation to the data being transferred by the transferring unit, wherein when a first mode is set, the calculator transmits a result of the checksum operation to the transferring unit, and the transferring unit transfers the result to the second memory, and when a second mode that is different from the first mode is set, the calculator applies the checksum operation to partial data that is included in the data and has been specified as a target of the checksum operation, and transmits a result of the checksum operation applied to the partial data to the register.

According to the second aspect of the present invention, there is provided a system, comprising: a controller; the first memory; the second memory; and the information processing apparatus.

According to the third aspect of the present invention, there is provided an information processing method performed by an information processing apparatus including a register, a transferring unit that transfers data stored in a first memory to a second memory, and a calculator that applies a checksum operation to the data being transferred by the transferring unit, wherein when a first mode is set, the calculator transmits a result of the checksum operation to the transferring unit, and the transferring unit transfers the result to the second memory, and when a second mode that is different from the first mode is set, the calculator applies the checksum operation to partial data that is included in the data and has been specified as a target of the checksum operation, and transmits a result of the checksum operation applied to the partial data to the register.

According to the fourth aspect of the present invention, there is provided a non-transitory computer-readable storage medium storing a computer program for a computer including a register, a transferring unit that transfers data stored in a first memory to a second memory, and a calculator that applies a checksum operation to the data being transferred by the transferring unit, the computer program causing the computer to, when a first mode is set, cause the calculator to transmit a result of the checksum operation to the transferring unit, and cause the transferring unit to transfer the result to the second memory, and when a second mode that is different from the first mode is set, cause the calculator to apply the checksum operation to partial data that is included in the data and has been specified as a target of the checksum operation, and transmit a result of the checksum operation applied to the partial data to the register.

Further features of the present invention will become apparent from the following description of exemplary embodiments (with reference to the attached drawings).

BRIEF DESCRIPTION OF THE DRAWINGS

FIG. 1 is a block diagram showing an exemplary configuration of a system.

FIGS. 2A and 2B show exemplary structures of descriptors.

FIG. 3 shows an exemplary structure of a register unit 104.

DESCRIPTION OF THE EMBODIMENTS

Figure 4:
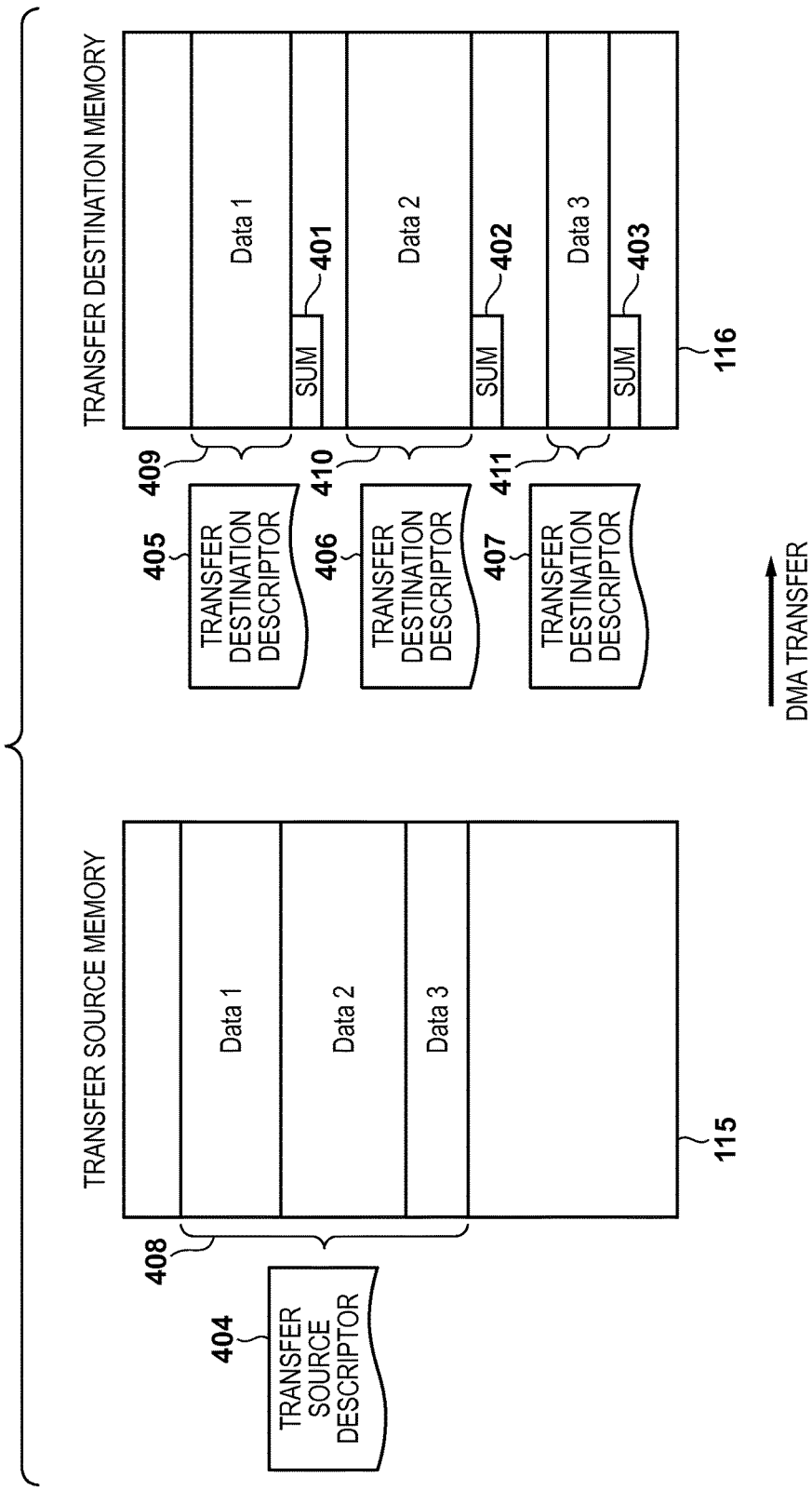
FIG. 4 shows exemplary operations in a normal mode.

The following describes embodiments of the present invention with reference to the attached drawings. It should be noted that each of the embodiments described below represents an example of specific embodiments of the present invention, and represents one of specific working examples of the configurations described in the claims.

First Embodiment

In the following description, the present embodiment concerns an example of a system including a data processing apparatus functioning as an information processing apparatus that transfers data from a first memory to a second memory (DMA transfer) and applies a checksum operation to the data being transferred. First, with reference to a block diagram of FIG. 1, an exemplary configuration of the system according to the present embodiment will be described.

As shown in FIG. 1, the system according to the present embodiment includes a data processing apparatus 101, a CPU 114, a transfer source memory 115, a transfer destination memory 116, and a descriptor memory 117, which are all connected to a shared bus 113.

First, the CPU 114 will be described. The CPU 114 is an example of a controller that controls the operations in the entire system; for example, it issues various operational instructions and configures settings with respect to the data processing apparatus 101 via the bus 113 and a register I/F 107.

Next, the transfer source memory 115 and the transfer destination memory 116 will be described. Transfer target data, which is data to be transferred, is stored in the transfer source memory 115, and the data processing apparatus 101 transfers this data to the transfer destination memory 116.

Next, the descriptor memory 117 will be described. In order to cause the data processing apparatus 101 to perform data transfer (transfer of data from the transfer source memory 115 to the transfer destination memory 116), the CPU 114 needs to register a descriptor with the descriptor memory 117, and register a storage address of the descriptor in the descriptor memory 117 with the data processing apparatus 101. The descriptor memory 117 accordingly functions as a memory with which the CPU 114 registers a descriptor.

A description is now given of a descriptor with reference to FIGS. 2A and 2B. There are two types of descriptors, namely, a transfer source descriptor pertaining to a transfer source, and a transfer destination descriptor pertaining to a transfer destination; the CPU 114 generates one or more transfer source descriptors and one or more transfer destination descriptors.

FIG. 2A shows a format of a transfer source descriptor. Data Start Address (SRC_DSA 201) is a starting address (in the transfer source memory 115) of transfer target data. Data Length (SRC_DL 202) is the size (data length) of the transfer target data. Next Descriptor Enable (SRC_NDE 203) is a flag value indicating whether or not the next transfer source descriptor exists; SRC_NDE 203 of "1" indicates that the next transfer source descriptor exists, whereas SRC_NDE 203 of "0" indicates that the next transfer source descriptor does not exist. Next Descriptor Address (SRC_NDA 204) is a field that is used to indicate a starting address (in the descriptor memory 117) of the next transfer source descriptor when the next transfer source descriptor exists (when SRC_NDE 203 is "1").

FIG. 2B shows a format of a transfer destination descriptor. Data Start Address (DST_DSA 211) is a starting address of an area (storage area) in the transfer destination memory 116 for storing transfer target data. Data Length (DST_DL 212) is the size of the storage area. Next Descriptor Enable (DST_NDE 213) is a flag value indicating whether or not the next transfer destination descriptor exists. DST_NDE 213 of "1" indicates that the next transfer destination descriptor exists, whereas DST_NDE 213 of "0" indicates that the next transfer destination descriptor does not exist. Next Descriptor Address (DST_NDA 214) is a field that is used to indicate a starting address (in the descriptor memory 117) of the next transfer destination descriptor when the next transfer destination descriptor exists (when DST_NDE 213 is "1"). Checksum Enable (CS_EN 215) is a value (mode value) corresponding to an operation mode in the present system. When a normal mode is set, CS_EN 215 is "1", and when a register mode is set, CS_EN 215 is "0". The normal mode and the register mode will be described later.

Due to the above-described structures of the transfer source and destination descriptors, even when a plurality of transfer source descriptors and a plurality of transfer destination descriptors have been generated and stored in the descriptor memory 117 (SRC_NDE=DST_NDE="1"), it is sufficient to register, with the data processing apparatus 101, a starting address of the first transfer source descriptor among the plurality of transfer source descriptors and a starting address of the first transfer destination descriptor among the plurality of transfer destination descriptors; a starting address of the $N^{th}$ transfer source descriptor can be obtained from SRC_NDA 204 of the $(N-1)^{th}$ transfer source descriptor, and a starting address of the $N^{th}$ transfer destination descriptor can be obtained from DST_NDA 214 of the $(N-1)^{th}$ transfer destination descriptor (N being an integer equal to or larger than 2).

It should be noted that the formats of the transfer source descriptor and the transfer destination descriptor are not limited to the formats shown in FIGS. 2A and 2B. For example, instead of preparing the transfer source descriptor and the transfer destination descriptor separately, they may be combined into one descriptor.

Next, the data processing apparatus 101 will be described. The data processing apparatus 101 includes a DMA transfer controller 102, a calculating unit 103, and a register unit 104. While the DMA transfer controller 102 is connected to the bus 113 via a read data I/F 105 and a write data I/F 106, the register unit 104 is connected to the bus 113 via the register I/F 107.

The DMA transfer controller 102 controls the operations of the entire data processing apparatus 101, and mainly controls transfer of data from the transfer source memory 115 to the transfer destination memory 116. The calculating unit 103 applies a checksum operation to data being transferred to the transfer destination memory 116 via the write data I/F 106. The register unit 104 is a memory for holding, for example, various types of information set by the CPU 114.

An exemplary structure of the register unit 104 will now be described with reference to FIG. 3.

SRC Descriptor Address (SRC_DA 301) is an area for registering a starting address of the first transfer source descriptor among the transfer source descriptors registered with the descriptor memory 117.

DST_Descriptor Address (DST_DA 302) is an area for registering a starting address of the first transfer destination descriptor among the plurality of transfer destination descriptors registered with the descriptor memory 117.

All of non-Checksum Header (NCS_HD 303), non-Checksum Footer (NCS_FD 304), and Checksum Length (CS_DL 305) are areas that are used when the operation mode in the present system is the register mode.

When the head portion of transfer target data contains partial data to be excluded from the checksum operation, information that prescribes the partial data in the transfer target data is registered with the area NCS_HD 303. For example, the data size (data length) from the head of the transfer target data to the back end of the partial data is registered with NCS_HD 303. It is assumed that, in an initial state of the present system (especially the data processing apparatus 101), "0" is registered with NCS_HD 303.

When the tail portion of the transfer target data contains partial data to be excluded from the checksum operation, information that prescribes the partial data in the transfer target data is registered with the area NCS_FD 304. For example, the data size (data length) from the head of the partial data to the back end of the transfer target data is registered with NCS_FD 304. It is assumed that, in the initial state of the present system (especially the data processing apparatus 101), "0" is registered with NCS_FD 304.

The size of an area in the transfer destination memory 116 for storing the transfer target data is registered with the area CS_DL 305, and a value registered therewith is the same as the value of DST_DL 212. It is assumed that, in the initial state of the present system (especially the data processing apparatus 101), a random value is registered with CS_DL 305.

A value indicating an operation mode in the present system is registered with an area Register-Mode Enable (REG_EN 306); "1" is registered with REG_EN 306 to set the normal mode, and "0" is registered with REG_EN 306 to set the register mode. It is assumed that, in the initial state of the present system (especially the data processing apparatus 101), "1" is registered with REG_EN 306.

A value indicating whether or not data transfer processing and the checksum operation have been completed in the data processing apparatus 101 is written to an area Status (STS 307). When the data processing apparatus 101 is in a standby state, executing the data transfer processing, or executing the checksum operation, "0" is registered with STS 307. On the other hand, when the data processing apparatus 101 has completed the data transfer processing and the checksum operation, "1" is registered with STS 307. It should be noted that, in the initial state of the present system (especially the data processing apparatus 101), "0" is registered with STS 307.

Checksum FIFO (CS_FIFO 308), which is an area for storing the checksum operation result, is composed of an internal eight-level FIFO and holds an arbitrary bit representing flag information indicating whether or not the FIFO holds the checksum operation result. When the flag information indicates "0", it means that the checksum operation result to be read is held, and when the flag information indicates "1", it means that the checksum operation result to be read is not held.

It should be noted that the register unit 104 is not limited to having the structure shown in FIG. 3, and may additionally include the following fields.

Abort Setting Field

By setting "1" to this field, the checksum operation can be aborted. During the normal mode, "0000" is output as the checksum operation result, whereas in the register mode, nothing is output as the checksum operation result. In the initial state, "0" is set to the abort setting field.

Inverse Setting Field

This field enables selection of a method for describing the checksum operation result. A checksum used with TCP/IP communication protocols is calculated by obtaining the one's complement of the one's complement sum of an entire packet. Therefore, the one's complement sum is used as the checksum operation result when "0" is input to this field, and the complement of the one's complement sum is used as the checksum operation result when "1" is input to this field.

Free-Run Setting Field

This field is used to set whether or not to overwrite the checksum operation result when the FIFO of CS_FIFO 308, to which the checksum operation result is output, is full during operation in the register mode. When "0" is input to this field, writing is stopped if the FIFO of CS_FIFO 308 is full, and when "1" is input to this field, the checksum operation result is overwritten.

Figure 6:
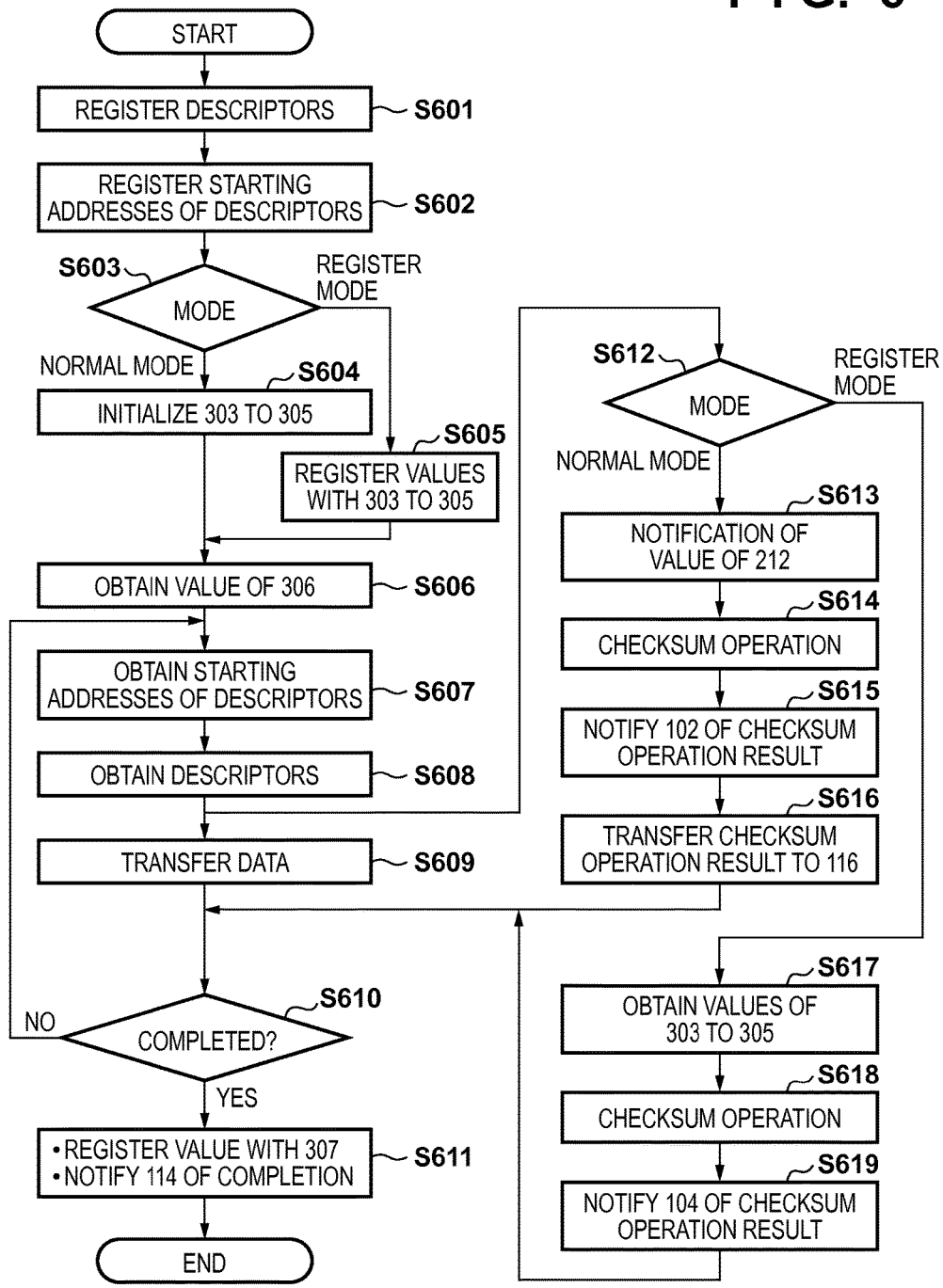
FIG. 6 is a flowchart of system operations.

The following describes the operations of the system configured in the above-described manner with reference to a flowchart of FIG. 6.

<Step S601>

The CPU 114 registers one or more transfer source descriptors and one or more transfer destination descriptors with the descriptor memory 117 via the bus 113.

<Step S602>

The CPU 114 registers a starting address of the first transfer source descriptor in the descriptor memory 117, among one or more transfer source descriptors registered with the descriptor memory 117, with SRC_DA 301 of the register unit 104 via the bus 113 and the register I/F 107.

The CPU 114 also registers a starting address of the first transfer destination descriptor in the descriptor memory 117, among one or more transfer destination descriptors registered with the descriptor memory 117, with DST_DA 302 of the register unit 104 via the bus 113 and the register I/F 107. Furthermore, the CPU 114 registers "1" or "0" with REG_EN 306 so as to indicate one of the operation modes, i.e., the normal mode and the register mode, to activate in.

<Step S603>

When the CPU 114 has registered the normal mode as the operation mode, the processing proceeds to step S604, and when it has registered the register mode, the processing proceeds to step S605.

<Step S604>

The CPU 114 initializes all of the areas NCS_HD 303, NCS_FD 304, and CS_DL 305, thereby registering their respective initial values therewith. A value indicating the normal mode is registered with REG_EN 306. It should be noted that, if these areas have already been initialized, the process of the present step can be omitted.

<Step S605>

The CPU 114 registers corresponding values with NCS_HD 303, NCS_FD 304, and CS_DL 305. As a result, a value prescribing the head portion (partial data excluded from the checksum operation) of data that is about to be transferred is registered with NCS_HD 303. A value prescribing the tail portion (partial data excluded from the checksum operation) of the data that is about to be transferred is registered with NCS_FD 304. A value that is the same as the value of DST_DL 212 is registered with CS_DL 305. A value indicating the register mode is registered with REG_EN 306.

<Step S606>

The calculating unit 103 obtains a value registered with REG_EN 306 from the register unit 104 via a register signal 110.

<Step S607>

The process of step S607 differs between the first time and the N$^{th}$ time (N being an integer equal to or larger than two).

In the first step S607, the DMA transfer controller 102 obtains the starting addresses from SRC_DA 301 and DST_DA 302 via a register signal 109.

In the N$^{th}$ step S607, the DMA transfer controller 102 obtains the starting address from SRC_NDA 204 if the value of SRC_NDE 203 of the transfer source descriptor that was obtained in the (N−1)$^{th}$ step S608 is "1". Similarly, the DMA transfer controller 102 obtains the starting address from DST_NDA 214 if the value of DST_NDE 213 of the transfer destination descriptor that was obtained in the (N−1)$^{th}$ step S608 is "1".

<Step S608>

The DMA transfer controller 102 accesses the starting address of the transfer source descriptor (in the descriptor memory 117) obtained in step S607 via the read data I/F 105 and the bus 113, and reads this transfer source descriptor. The DMA transfer controller 102 also accesses the starting address of the transfer destination descriptor (in the descriptor memory 117) obtained in step S607 via the read data I/F 105 and the bus 113, and reads this transfer destination descriptor.

<Step S609>

Using the address indicated by SRC_DSA 201 of the transfer source descriptor obtained in step S608 as a starting address, the DMA transfer controller 102 reads data corresponding to the data length indicated by SRC_DL 202 of this transfer source descriptor from the transfer source memory 115 via the read data I/F 105. Then, using DST_DSA 211 of the transfer destination descriptor obtained in step S608 as a starting address, the DMA transfer controller 102 writes the read data to a storage area having a size indicated by DST_DL 212 of this transfer destination descriptor in the transfer destination memory 116 via the write data I/F 106.

In this way, data is transferred from the transfer source memory 115 to the transfer destination memory 116 based on the descriptors (transfer source descriptor and transfer destination descriptor) obtained in step S608.

<Step S612>

When the CPU 114 has activated the data processing apparatus 101 in the normal mode, the processing proceeds to step S613, and when it has activated the data processing apparatus 101 in the register mode, the processing proceeds to step S617.

<Step S613>

The DMA transfer controller 102 checks that the value of CS_EN 215 of the transfer destination descriptor is "1", and notifies the calculating unit 103 of DST_DL 212 of the transfer destination descriptor via a notification signal 111.

<Step S614>

The calculating unit 103 obtains, via a snoop I/F 112, data that is transferred to the transfer destination memory 116 via the write data I/F 106, and applies calculation for obtaining the one's complement sum, that is to say, the checksum operation to the obtained data in accordance with a fixed data width. Then, the calculating unit 103 determines whether or not the amount of target data to which the checksum operation has been applied has reached the value of DST_DL 212, a notification of which has been transmitted from the DMA transfer controller 102 via the notification signal 111; if the amount of the target data has reached the value of DST_DL 212, it determines that the checksum operation has been completed, the DMA transfer controller 102 is notified of the completion via the notification signal 111, and the processing proceeds to step S615.

<Step S615>

The calculating unit 103 notifies the DMA transfer controller 102 of the result of the checksum operation applied in step S614 via the notification signal 111.

<Step S616>

The DMA transfer controller 102 transmits the checksum operation result, which has been received from the calculating unit 103 via the notification signal 111, to the transfer destination memory 116 via the write data I/F 106 and the bus 113 so as to append this checksum operation result to the tail of the data that was transferred to the transfer destination memory 116 in step S609.

<Step S617>

The DMA transfer controller 102 checks that the value of CS_EN 215 of the transfer destination descriptor is "0", and the calculating unit 103 obtains the values registered with NCS_HD 303, NCS_FD 304, and CS_DL 305 from the register unit 104 via the register signal 110.

<Step S618>

Once the data transfer based on the descriptors obtained in step S608 has been started, data is transferred to the transfer destination memory 116 via the write data I/F 106, and the calculating unit 103 accordingly obtains this data, which is transferred via the write data I/F 106, in prescribed units via the snoop I/F 112. The calculating unit 103 also measures the amount of data obtained via the snoop I/F 112 following the start of the data transfer based on the descriptors obtained in step S608. The calculating unit 103 does not start the checksum operation until a measured value (a total amount of data obtained following the start of the data transfer) exceeds the data length indicated by NCS_HD 303; when the measured value has exceeded the indicated data length, the calculating unit 103 applies the checksum operation to data obtained thereafter via the snoop I/F 112. This checksum operation is applied to an amount of data indicated by "a value remaining after subtracting the value of NCS_HD 303 and the value of NCS_FD 304 from the value of DST_DL 212".

As a result, among the entire data transferred through the data transfer based on the descriptors obtained in step S608, a portion extending from the head of the entire data across the data length indicated by NCS_HD 303, as well as a portion extending from the tail of the entire data across the data length indicated by NCS_FD 304, is excluded from the checksum operation of the calculating unit 103, and the checksum operation is applied to the remaining portion of the entire data.

Then, the calculating unit 103 determines whether or not the amount of the target data to which the checksum operation has been applied has reached the amount of data indicated by "the value remaining after subtracting the value of NCS_HD 303 and the value of NCS_FD 304 from the value of DST_DL 212"; if the amount of the target data has reached the amount of data indicated by the remaining value, it determines that the checksum operation has been completed, and the processing proceeds to step S619.

<Step S619>

The calculating unit 103 registers the result of the checksum operation applied in step S618 with CS_FIFO 308 of the register unit 104 via the register signal 110.

<Step S610>

The DMA transfer controller 102 determines whether or not the value of SRC_NDE 203 of the transfer source descriptor and the value of DST_NDE 213 of the transfer destination descriptor are both zero; if these values are both zero, it determines that data transfers based on all descriptors have been completed, and the processing proceeds to step S611.

On the other hand, if at least one of the value of SRC_NDE 203 of the transfer source descriptor and the value of DST_NDE 213 of the transfer destination descriptor is "1", the processing returns to step S607.

<Step S611>

In the present step, a value indicating the completion of data transfer corresponding to each descriptor and the completion of the checksum operation for each data transfer is registered with STS 307 of the register unit 104. This registration is performed differently in the normal mode and the register mode.

In the normal mode, when the data transfer has been completed and a completion notification for the checksum operation has been received from the calculating unit 103 via the notification signal 111, the DMA transfer controller 102 detects the completion of the DMA transfer and the checksum operation, and registers the completion with STS 307 of the register unit 104.

In the register mode, when the data transfer has been completed, the DMA transfer controller 102 notifies the register unit 104 of the completion of the DMA transfer. Furthermore, when the checksum operation has been completed, the calculating unit 103 notifies the register unit 104 of the completion of the checksum operation. Consequently, a value indicating the completion of data transfer corresponding to each descriptor and the completion of the checksum operation for each data transfer is registered with STS 307 of the register unit 104.

In response, the register unit 104 notifies the CPU 114 of the value indicating the completion of the data transfer corresponding to each descriptor and the completion of the checksum operation for each data transfer via an interrupt signal 108.

A description is now given of processing according to the flowchart of FIG. 6 using specific examples. First, processing in the normal mode will be described using a specific example of FIG. 4. In FIG. 4, three pieces of transfer target data (Data 1, Data 2, Data 3) are stored adjacently in the transfer source memory 115 (in an area 408), and the following describes a case in which Data 1, Data 2, and Data 3 are DMA-transferred to areas in the transfer destination memory 116 that are not adjacent to one another (areas 409, 410, 411), and the checksum results of these pieces of data are stored into the transfer destination memory 116 (areas 401, 402, 403).

In order to enable such DMA transfer, the CPU 114 generates the following transfer source descriptors and transfer destination descriptors. As stated earlier, Data 1, Data 2, and Data 3 compose one data group written in the transfer source memory 115 at successive addresses, and hence the CPU 114 generates one transfer source descriptor 404 for this one data group. SRC_DSA 201 of the transfer source descriptor 404 stores a starting address of this one data group (that is to say, a starting address of Data 1) in the transfer source memory 115. SRC_DL 202 of the transfer source descriptor 404 stores a data size of this one data group (that is to say, a sum of the data sizes of Data 1, Data 2, and Data 3). As the transfer source memory 115 only stores this one data group (Data 1, Data 2, Data 3) as a transfer target and there is only one transfer source descriptor, i.e., the transfer source descriptor 404, SRC_NDE 203 and SRC_NDA 204 of the transfer source descriptor 404 store "0" and an invalid value, such as NULL, respectively.

Additionally, as stated earlier, Data 1, Data 2, and Data 3 are transferred to the areas in the transfer destination memory 116 that are not adjacent to one another, and hence transfer destination descriptors are generated in one-to-one correspondence with Data 1, Data 2, and Data 3. In FIG. 4, transfer destination descriptors 405, 406, and 407 are generated as the transfer destination descriptors for Data 1, Data 2, and Data 3, respectively.

In the transfer destination descriptor 405, DST_DSA 211 stores a starting address of an area (storage area) in the transfer destination memory 116 for storing Data 1, and DST_DL 212 stores a size of the area in the transfer destination memory 116 for storing Data 1. Furthermore, in the transfer destination descriptor 405, DST_NDE 213 stores "1" due to the existence of the transfer destination descriptor 406 for the next transfer target data, i.e., Data 2, and DST_NDA 214 stores a starting address of the transfer destination descriptor 406 in the descriptor memory 117.

In the transfer destination descriptor 406, DST_DSA 211 stores a starting address of an area (storage area) in the transfer destination memory 116 for storing Data 2, and DST_DL 212 stores a size of the area in the transfer destination memory 116 for storing Data 2. Furthermore, in the transfer destination descriptor 406, DST_NDE 213 stores "1" due to the existence of the transfer destination descriptor 407 for the next transfer target data, i.e., Data 3, and DST_NDA 214 stores a starting address of the transfer destination descriptor 407 in the descriptor memory 117.

In the transfer destination descriptor 407, DST_DSA 211 stores a starting address of an area (storage area) in the transfer destination memory 116 for storing Data 3, and DST_DL 212 stores a size of the area in the transfer destination memory 116 for storing Data 3. Furthermore, in the transfer destination descriptor 407, DST_NDE 213 stores "0" as the next transfer target data does not exist, and DST_NDA 214 stores an invalid value, such as NULL.

Because of the normal mode, a value indicating the normal mode is registered with REG_EN 306. The CPU 114 registers the transfer source descriptor 404 and the transfer destination descriptors 405, 406, 407 with the descriptor memory 117, and also registers a starting address of the transfer source descriptor 404 and a starting address of the transfer destination descriptor 405 in the descriptor memory 117 with SRC_DA 301 and DST_DA 302 of the register unit 104, respectively.

The DMA transfer controller 102 obtains the starting addresses from SRC_DA 301 and DSC_DA 302, and with use of the obtained starting addresses, obtains the transfer source descriptor 404 and the transfer destination descriptor 405 from the descriptor memory 117. Then, the DMA transfer controller 102 reads, from the transfer source memory 115, data in the area (area 408) specified by SRC_DSA 201 and SRC_DL 202 of the transfer source descriptor 404 as transfer target data. Subsequently, the DMA transfer controller 102 sequentially transfers the read data, starting from the head thereof, to the area (area 409) in the transfer destination memory 116 specified by DST_DSA 211 and DST_DL 212 of the transfer destination descriptor 405. The resultant transferred data is Data 1. The calculating unit 103 applies the checksum operation to Data 1 during the transfer of Data 1, and the DMA transfer controller 102 obtains the checksum operation result and registers the same with the area 401 in the transfer destination memory 116. As the value of DST_NDE 213 of the transfer destination descriptor 405 is "1", the DMA transfer controller 102 accesses the address indicated by DST_NDA 214 of the transfer destination descriptor 405 and obtains the transfer destination descriptor 406.

The DMA transfer controller 102 sequentially transfers untransferred data (Data 2, Data 3), starting from the head thereof, to the area (area 410) in the transfer destination memory 116 specified by DST_DSA 211 and DST_DL 212 of the transfer destination descriptor 406. The resultant transferred data is Data 2. The calculating unit 103 applies the checksum operation to Data 2 during the transfer of Data 2, and the DMA transfer controller 102 obtains the checksum operation result and registers the same with the area 402 in the transfer destination memory 116. As the value of DST_NDE 213 of the transfer destination descriptor 406 is "1", the DMA transfer controller 102 accesses the address indicated by DST_NDA 214 of the transfer destination descriptor 406 and obtains the transfer destination descriptor 407.

The DMA transfer controller 102 sequentially transfers untransferred data (Data 3), starting from the head thereof, to the area (area 411) in the transfer destination memory 116 specified by DST_DSA 211 and DST_DL 212 of the transfer destination descriptor 407. The resultant transferred data is Data 3. The calculating unit 103 applies the checksum operation to Data 3 during the transfer of Data 3, and the DMA transfer controller 102 obtains the checksum operation result and registers the same with the area 403 in the transfer destination memory 116. As the value of SRC_NDE 203 of the transfer source descriptor 404 and the value of DST_NDE 213 of the transfer destination descriptor 407 are both "0", the DMA transfer controller 102 registers a value indicating the completion of the data transfer and the completion of the checksum operation with STS 307 of the register unit 104 via the register signal 109. In response, the register unit 104 notifies the CPU 114 of the value indicating the completion of the data transfer and the completion of the checksum operation via the interrupt signal 108.

Figure 5:
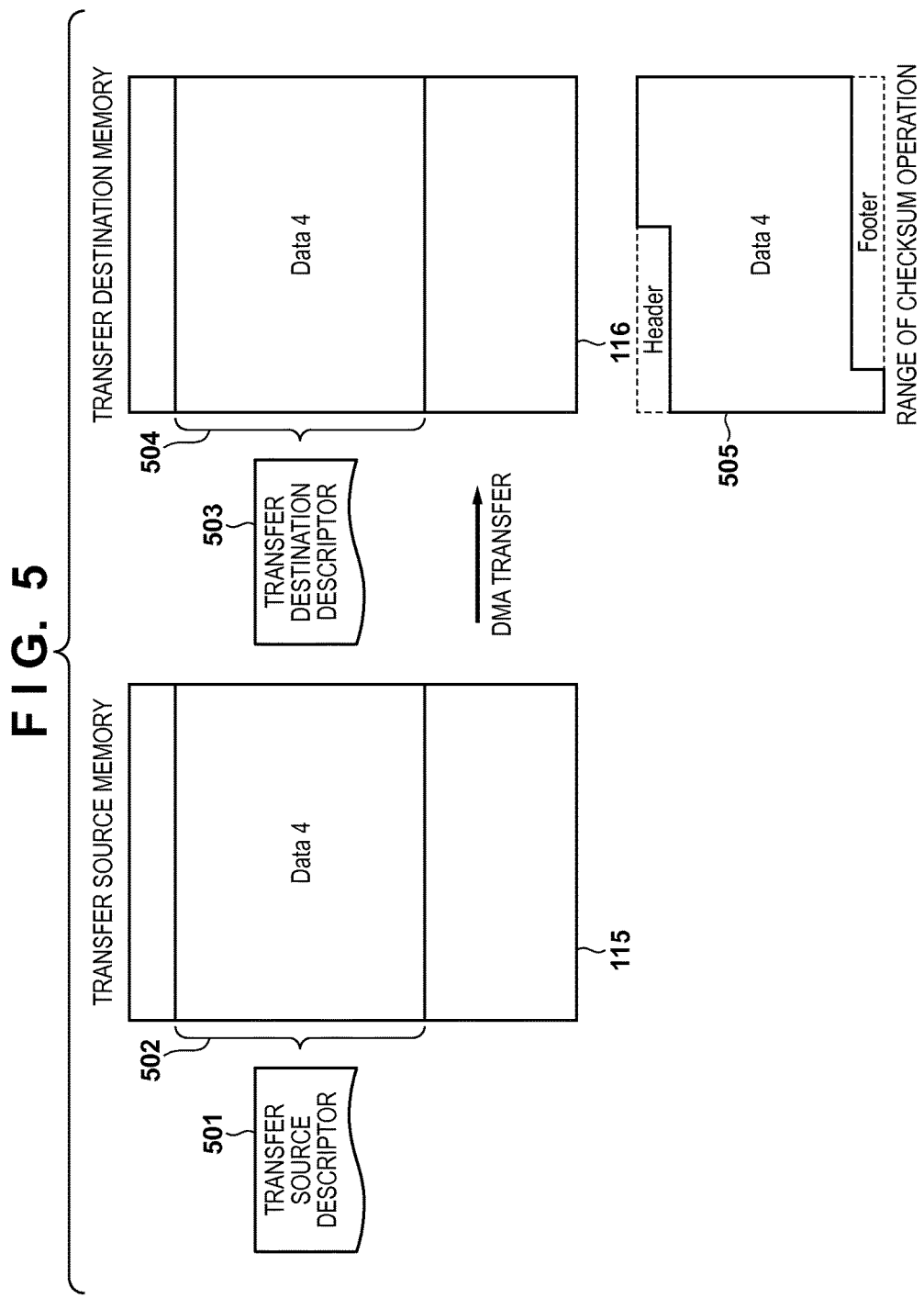
FIG. 5 shows exemplary operations in a register mode.

Next, processing in the register mode will be described using a specific example of FIG. 5. In FIG. 5, transfer target data (Data 4) is stored in the transfer source memory 115 (in an area 502), and the following describes a case in which Data 4 is DMA-transferred to an area (area 504) in the transfer destination memory 116, and the checksum result of Data 4 is stored into the register unit 104.

In order to enable such DMA transfer, the CPU 114 generates a transfer source descriptor 501 and a transfer destination descriptor 503 for Data 4.

SRC_DSA 201 of the transfer source descriptor 501 stores a starting address of Data 4 in the transfer source memory 115. SRC_DL 202 of the transfer source descriptor 501 stores a data size of Data 4. As the transfer source memory 115 only store Data 4 as a transfer target and there is only one transfer source descriptor, i.e., the transfer source descriptor 501, SRC_NDE 203 and SRC_NDA 204 of the transfer source descriptor 501 store "0" and an invalid value, such as NULL, respectively.

In the transfer destination descriptor 503, DST_DSA 211 stores a starting address of an area (storage area) in the transfer destination memory 116 for storing Data 4, and DST_DL 212 stores a size of the area in the transfer destination memory 116 for storing Data 4. Furthermore, in the transfer destination descriptor 503, DST_NDE 213 stores "0", and DST_NDA 214 stores an invalid value, such as NULL.

The calculating unit 103 does not apply the checksum operation to the entire Data 4; in the case of FIG. 5, it applies the checksum operation to the portion (partial data 505) other than the header (the size indicated by NCS_HD 303) and the footer (the size indicated by NCS_FD 304).

Because of the register mode, the header size, the footer size, a value that is the same as the value of DST_DL 212, and a value indicating the register mode are registered with NCS_HD 303, NCS_FD 304, CS_DL 305, and REG_EN 306 of the register unit 104, respectively. The CPU 114 registers the transfer source descriptor 501 and the transfer destination descriptor 503 with the descriptor memory 117, and also registers a starting address of the transfer source descriptor 501 and a starting address of the transfer destination descriptor 503 in the descriptor memory 117 with SRC_DA 301 and DST_DA 302 of the register unit 104, respectively.

The DMA transfer controller 102 obtains the starting addresses from SRC_DA 301 and DST_DA 302, and with use of the obtained starting addresses, obtains the transfer source descriptor 501 and the transfer destination descriptor 503 from the descriptor memory 117. Then, the DMA transfer controller 102 reads, from the transfer source memory 115, data in the area (area 502) specified by SRC_DSA 201 and SRC_DL 202 of the transfer source descriptor 501, i.e., Data 4, as transfer target data. Subsequently, the DMA transfer controller 102 transfers the read Data 4 to the area (area 504) in the transfer destination memory 116 specified by DST_DSA 211 and DST_DL 212 of the transfer destination descriptor 503. The calculating unit 103 applies the checksum operation to the partial data 505, which is the portion of Data 4 other than the header and the footer prescribed by NCS_HD 303 and NCS_FD 304, during the transfer of Data 4, obtains the checksum operation result, and registers the same with CS_FIFO 308 of the register unit 104.

As the value of SRC_NDE 203 of the transfer source descriptor 501 and the value of DST_NDE 213 of the transfer destination descriptor 503 are both "0", a value indicating the completion of the data transfer and the completion of the checksum operation is registered with STS 307 of the register unit 104, and the register unit 104, in response, notifies the CPU 114 of the value indicating the completion of the data transfer and the completion of the checksum operation via the interrupt signal 108.

As described above, in the case where the DMA transfer and the checksum operation are performed in the normal mode, the DMA transfer controller 102 plays a part in main control for performing the checksum operation. On the other hand, in the case where the DMA transfer and the checksum operation are performed in the register mode, the calculating unit 103 plays a part in main control for performing the checksum operation.

According to the above-described embodiment, in the case where the checksum operation is performed in the normal mode, the procedure of DMA transfer settings, including the checksum operation, can be simplified while reducing overhead. On the other hand, in the case where the checksum operation is performed in the register mode, the DMA transfer settings, including the checksum operation, are enabled merely by adding a procedure for setting the substance of the checksum operation to an internal register. Accordingly, in the case where the checksum operation is performed in the register mode, there is no need to enhance the descriptor structure used in the normal mode. In this way, even in the case where DMA transfers are performed in succession by chaining a plurality of descriptors while supporting the register mode, the size of a memory area for storing the descriptors can be reduced.

It should be noted that the configuration of the above-described information processing apparatus is merely an example of the following configuration, and any modification/change may be made as long as a configuration that is at least equivalent to the following configuration is used. A configuration includes a register, a transferring unit that transfers data stored in a first memory to a second memory, and a calculator that applies a checksum operation to the data being transferred by the transferring unit; in this configuration, when a first mode is set, the following operation is executed.

That is to say, when the first mode is set, the calculator transmits the result of the checksum operation to the transferring unit, and the transferring unit transfers the result to the second memory. On the other hand, when a second mode that is different from the first mode is set, the calculator applies the checksum operation to partial data that is included in the data and has been specified as a target of the checksum operation, and transmits the result of the checksum operation applied to the partial data to the register.

Second Embodiment

In the first embodiment described above, data transfer and a checksum operation are performed by a system that is configured as shown in FIG. 1. However, the above-described system may be replaced with a computer including a register, a transferring unit that transfers data stored in a first memory to a second memory, and a calculator that applies a checksum operation to the data being transferred by the transferring unit. In this case, it is possible to cause the computer to execute the following processing by installing a computer program for the execution of the following processing in a memory of the computer, and causing a controller of the computer, such as a CPU, to execute the computer program.

When a first mode is set, the calculator is caused to transmit the result of the checksum operation to the transferring unit, and the transferring unit is caused to transfer the result to the second memory. On the other hand, when a second mode that is different from the first mode is set, the calculator is caused to apply the checksum operation to partial data that is included in the aforementioned data and has been specified as a target of the checksum operation, and transmit the result of the checksum operation applied to the partial data to the register.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-088553, filed Apr. 22, 2014, which is hereby incorporated by reference herein in its entirety.

What is claimed is:

1. An information processing apparatus, comprising:
a register;
one or more processors; and
a memory in communication with the one or more processors, the memory having stored thereon instructions that, when executed by the one or more processors, cause the information processing apparatus to:
transfer data stored in a first storage area designated by a first descriptor to a second storage area designated by a second descriptor;
apply a checksum operation to the data being transferred from the first storage area to the second storage area;
when a first mode is set, apply the checksum operation to all the data being transferred from the first storage area to the second storage area; and
when a second mode that is different from the first mode is set, (i) accumulate a data amount of the data being transferred from the first storage area to the second storage area, (ii) not apply the checksum operation to the data being transferred from the first storage area to the second storage area until the accumulated data amount exceeds a first data amount being based on setting information set in the register, (iii) apply the checksum operation to the data being transferred from the first storage area to the second storage area if the accumulated data amount exceeds the first data amount, and (iv) terminate the checksum operation if the accumulated data amount exceeds a second data amount which is larger than the first data amount and is based on the setting information set in the register.

2. The information processing apparatus according to claim 1, wherein when the first mode is set, the instructions, when executed by the one or more processors, further cause the information processing apparatus to:
transmit a size of the data before transferring the data,
apply the checksum operation to an amount of data corresponding to the size, and then transmit a result of the checksum operation, and
append the result of the checksum operation to a tail of the data transferred to the second storage area.

3. The information processing apparatus according to claim 1, wherein when the second mode is set, the instructions, when executed by the one or more processors, further cause the information processing apparatus to:

obtain the setting information from the register, not perform the checksum operation until the accumulated data amount exceeds the first data amount being based on the setting information obtained from the register, perform the checksum operation if the accumulated data amount exceeds the first data amount, terminate the checksum operation if the accumulated data amount exceeds the second data amount being based on the setting information obtained from the register, and transmit a result of the checksum operation to the register.

4. An information processing method performed by an information processing apparatus including a register, the information processing method comprising:

transferring data stored in a first storage area designated by a first descriptor to a second storage area designated by a second descriptor;

applying a checksum operation to the data being transferred from the first storage area to the second storage area;

when a first mode is set,
applying a checksum operation to all the data being transferred from the first storage area to the second storage area; and when a second mode that is different from the first mode is set,
accumulating a data amount of the data being transferred from the first storage area to the second storage area,
not applying the checksum operation to the data being transferred from the first storage area to the second storage area until the accumulated data amount exceeds a first data amount being based on setting information set in the register,
applying the checksum operation to the data being transferred from the first storage area to the second storage area if the accumulated data amount exceeds the first data amount, and
terminating the checksum operation if the accumulated data amount exceeds a second data amount which is larger than the first data amount and is based on the setting information set in the register.

5. A non-transitory computer-readable storage medium storing a computer program for a computer including a register, the computer program causing the computer to:

transfer data stored in a first storage area designated by a first descriptor to a second storage area designated by a second descriptor;

applying a checksum operation to the data being transferred from the first storage area to the second storage area;

when a first mode is set,
apply a checksum operation to all the data being transferred from a first storage area to a second storage area; and when a second mode that is different from the first mode is set,
accumulate a data amount of the data being transferred from the first storage area to the second storage area,
not apply the checksum operation to the data being transferred from the first storage area to the second storage area until the accumulated data amount exceeds a first data amount being based on setting information set in the register,
apply the checksum operation to the data being transferred from the first storage area to the second storage area if the accumulated data amount exceeds the first data amount, and
terminate the checksum operation if the accumulated data amount exceeds a second data amount which is larger than the first data amount and is based on the setting information set in the register.

6. The information processing apparatus according to claim 1, wherein in a case where the first mode is set, the instructions further cause the information processing apparatus to store a result of the checksum operation in the second storage area, and wherein in a case where the second mode is set, the instructions further cause the information processing apparatus to store the result of the checksum operation in the register.

* * * * *